(12) United States Patent
Pointon et al.

(10) Patent No.: US 11,047,339 B2
(45) Date of Patent: Jun. 29, 2021

(54) GAS TURBINE ENGINE WITH OPTIMIZED FAN, CORE PASSAGE INLET, AND COMPRESSOR FORWARD STAGE DIAMETER RATIOS

(71) Applicant: ROLLS-ROYCE plc, London (GB)

(72) Inventors: James M. Pointon, Bristol (GB); Stephen J. Bradbrook, Clevedon (GB)

(73) Assignee: ROLLS-ROYCE plc, London (GB)

( * ) Notice: Subject to any disclaimer, the term of this patent is extended or adjusted under 35 U.S.C. 154(b) by 221 days.

(21) Appl. No.: 16/103,329

(22) Filed: Aug. 14, 2018

(65) Prior Publication Data

US 2019/0048826 A1   Feb. 14, 2019

(30) Foreign Application Priority Data

Aug. 14, 2017 (GB) ..................... 1712993

(51) Int. Cl.
  *F02K 3/068* (2006.01)
  *F02K 3/06* (2006.01)
  (Continued)

(52) U.S. Cl.
  CPC ............. *F02K 3/068* (2013.01); *F01D 1/02* (2013.01); *F02C 3/107* (2013.01); *F02C 7/04* (2013.01);
  (Continued)

(58) Field of Classification Search
  CPC . F02K 3/06; F02K 3/065; F02K 3/068; F02C 7/36; F02C 7/04; F02C 3/04;
  (Continued)

(56) References Cited

U.S. PATENT DOCUMENTS

| 10,287,917 B2* | 5/2019 | Schwarz .................. F02K 3/06 |
| 10,316,758 B2* | 6/2019 | Schwarz .................. F02C 7/36 |

(Continued)

FOREIGN PATENT DOCUMENTS

| WO | 2014143248 | 9/2014 |
| WO | 2014182546 | 11/2014 |
| WO | 2015012923 | 1/2015 |

OTHER PUBLICATIONS

Great Britain Search Report dated Jan. 23, 2018, issued in GB Patent Application No. 1712993.3.

(Continued)

*Primary Examiner* — Alain Chau
(74) *Attorney, Agent, or Firm* — Brinks Gilson & Lione

(57) ABSTRACT

An aircraft gas turbine engine comprises a fan coupled to a fan drive turbine, the fan being configured to provide a bypass flow (B) and a core flow (A) in use. The engine includes a reduction gearbox which couples the fan to the fan drive turbine and a core compressor arrangement. The core compressor arrangement has a core inlet at an upstream end of a core gas flow passage (A) defined by radially inner and outer walls, and at least a first compressor rotor blade provided at an upstream end of the compressor arrangement. The radially inner wall of the core inlet defines a first diameter ($D_{INLET}$), and a root leading edge of the first compressor rotor blade defines a second diameter ($D_{COMP}$). A first ratio ($D_{INLET}:D_{COMP}$) of the first diameter ($D_{COMP}$) to the second diameter ($D_{COMP}$) is greater than or equal to 1.4.

18 Claims, 2 Drawing Sheets

(51) Int. Cl.
*F02C 7/04* (2006.01)
*F02C 3/107* (2006.01)
*F02C 7/36* (2006.01)
*F04D 29/54* (2006.01)
*B64D 33/02* (2006.01)
*F01D 1/02* (2006.01)

(52) U.S. Cl.
CPC ............... *F02C 7/36* (2013.01); *F02K 3/06* (2013.01); *B64D 2033/0286* (2013.01); *F04D 29/547* (2013.01); *F05D 2220/32* (2013.01); *F05D 2240/24* (2013.01); *F05D 2250/51* (2013.01); *F05D 2250/71* (2013.01); *F05D 2260/40311* (2013.01)

(58) Field of Classification Search
CPC ...... F02C 3/107; F04D 29/545; F04D 29/547; F05D 2250/51; F05D 2250/71; B64D 33/02; B64D 2033/0286
See application file for complete search history.

(56) References Cited

U.S. PATENT DOCUMENTS

| | | | |
|---|---|---|---|
| 10,544,802 B2* | 1/2020 | Brilliant | F02K 3/06 |
| 2012/0114479 A1* | 5/2012 | Staubach | F02K 3/06 |
| | | | 415/220 |
| 2013/0192198 A1* | 8/2013 | Brilliant | F04D 29/682 |
| | | | 60/226.1 |
| 2014/0186158 A1 | 7/2014 | Merry et al. | |
| 2016/0003145 A1* | 1/2016 | Qiu | F02K 3/06 |
| | | | 60/726 |
| 2016/0061052 A1 | 3/2016 | Suciu et al. | |
| 2016/0069270 A1* | 3/2016 | Schwarz | F02C 7/36 |
| | | | 60/805 |
| 2016/0069275 A1* | 3/2016 | Lecordix | F02C 9/22 |
| | | | 415/1 |
| 2016/0076460 A1* | 3/2016 | Schwarz | F02K 3/06 |
| | | | 60/805 |
| 2016/0108807 A1* | 4/2016 | Schwarz | F01D 5/12 |
| | | | 60/805 |
| 2016/0131028 A1* | 5/2016 | Lauer | F02C 6/206 |
| | | | 60/805 |
| 2016/0138425 A1* | 5/2016 | Schwarz | F01D 5/02 |
| | | | 415/122.1 |
| 2016/0186690 A1* | 6/2016 | Florea | F04D 27/0246 |
| | | | 60/226.1 |
| 2019/0024586 A1* | 1/2019 | Mardjono | F04D 19/02 |

OTHER PUBLICATIONS

Extended European Search Report, issued in EP Application 18183848.3, dated Jan. 7, 2019, pp. 1-7, European Patent Office, Munich, Germany.

* cited by examiner

GAS TURBINE ENGINE WITH OPTIMIZED FAN, CORE PASSAGE INLET, AND COMPRESSOR FORWARD STAGE DIAMETER RATIOS

CROSS-REFERENCE TO RELATED APPLICATIONS

This application is based upon and claims the benefit of priority from British Patent Application No. GB 1712993.3, filed on 14 Aug. 2017, the entire contents of which are herein incorporated by reference.

BACKGROUND

Technical Field

The present disclosure concerns a geared aircraft gas turbine engine.

Description of the Related Art

Aircraft gas turbine engines typically comprise a gas turbine engine core and a core driven fan enclosed within a fan nacelle. Air flows through the fan in use, and is divided into two airflows downstream—a bypass flow and a core flow. The ratio between the mass flow of air in the bypass flow to the airflow of the core flow is known as the bypass ratio. At subsonic aircraft velocities, a large bypass ratio is desirable for high propulsive efficiency.

Gas turbine engine efficiency can also be increased by increasing the Overall Pressure Ratio (OPR). High OPR results in high thermodynamic efficiency, and so low fuel burn. A high OPR can be achieved by increasing the number of compressor stages.

Conventionally, a fan is provided to drive the bypass flow, while one or more compressors are provided to provide core flow. The fan is normally located ahead of the core compressor, and so effectively provides an additional stage of compression for the core. The core inlet is provided at the root of the fan, downstream thereof.

There are numerous competing requirements and parameters for aircraft gas turbine engines. They must have low fuel burn, whilst also being lightweight and have small dimensions. Recently, geared turbofans have been proposed, such as in US patent application 2014186158. In a geared turbofan, a turbine is coupled to the fan via a reduction gearbox. Such a reduction gearbox results in a low speed fan (and so low fan tip speeds) having a large diameter (and so high bypass ratio), whilst also having a high speed turbine (and so high turbine tip speeds). This de-coupling of the fan speed from the core compressor and turbine speed opens the design space for the fan and the core considerably. Consequently, the dimensions of conventional gas turbine engine cores and fans may be non-optimal where a reduction gearbox is introduced.

SUMMARY

According to a first aspect there is provided an aircraft gas turbine engine comprising:
a fan coupled to a fan drive turbine, the fan being configured to provide a bypass flow and a core flow in use;
a reduction gearbox which couples the fan to the fan drive turbine;
a core compressor arrangement, the core compressor arrangement having a core inlet at an upstream end of a core gas flow passage defined by radially inner and outer walls, the radially inner wall of the core inlet defining a first diameter; wherein;
the core compressor arrangement comprises at least an axially forwardmost compressor rotor blade, a root leading edge of the axially forwardmost compressor rotor blade defining a second diameter, wherein a first ratio of the first diameter to the second diameter is greater than or equal to 1.4.

The first ratio may be less than or equal to 3. In one embodiment, the first ratio $R_1$ may be 1.5. In a further embodiment, the first ratio $R_1$ is 1.75.

A first axial distance may be defined by an axial distance between the core inlet and the root leading edge of the axially forwardmost compressor rotor blade. A second ratio may be defined by a ratio of the first axial distance divided by a difference between the first diameter and the second diameter may be between 0.8 and 1.5. The second ratio may be between 1 and 1.5, and may be greater than or equal to 1, and less than or equal to 1.5.

A third ratio may be defined by a ratio between a diameter at the leading edge at a root of the fan and a diameter at a leading edge of a tip of the fan. The third ratio may be greater than or equal to 0.2 and less than or equal to 0.4, and may be approximately 0.25.

A fourth ratio $R_4$ may be defined by a ratio between the diameter at the leading edge of a tip of the fan and the diameter at the leading edge at the root of the first core compressor rotor blade. The fourth ratio may be greater than or equal to 3 and less than or equal to 6, and may be approximately 4.

A fifth ratio may be defined by a ratio between the diameter at the leading edge of the tip of the fan and the diameter at the core inlet. The fifth ratio $R_5$ may be greater than or equal to 2.5 and less than or equal to 3.5 and may be approximately 2.75.

A sixth ratio ($R_6$) may be defined by a ratio between the diameter at the leading edge of the tip of the fan and the diameter at a leading edge of the tip of the forwardmost compressor rotor blade. The sixth ratio ($R_6$) may be greater than or equal to 2.5 and 3.5, and may be approximately 3.

The core compressor arrangement may comprise a low pressure compressor upstream of a high pressure compressor. The low pressure compressor may be directly coupled to the fan drive turbine by a low pressure shaft. The gas turbine engine may comprise a high pressure turbine coupled to the high pressure compressor by a high pressure shaft.

The gas turbine engine may have a bypass ratio defined by a ratio of air mass flow that passes through the fan and around the core inlet, to airflow that passes through the core inlet. The bypass ratio may be between 13 and 25.

The reduction gearbox may have a reduction ratio of between 2:1 and 5:1.

The engine may be configured to provide an overall pressure ratio of between 40:1 and 80:1 in use.

The low pressure compressor may be configured to provide a pressure ratio in use of between 2:1 and 4:1.

The high pressure compressor may be configured to provide a pressure ratio in use of between 10:1 and 30:1.

The fan may be configured to provide a fan pressure ratio of between 1.1 and 1.5.

The low pressure compressor may comprise between 2 and 4 stages, and the high pressure compressor may comprise between 8 and 12 stages.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
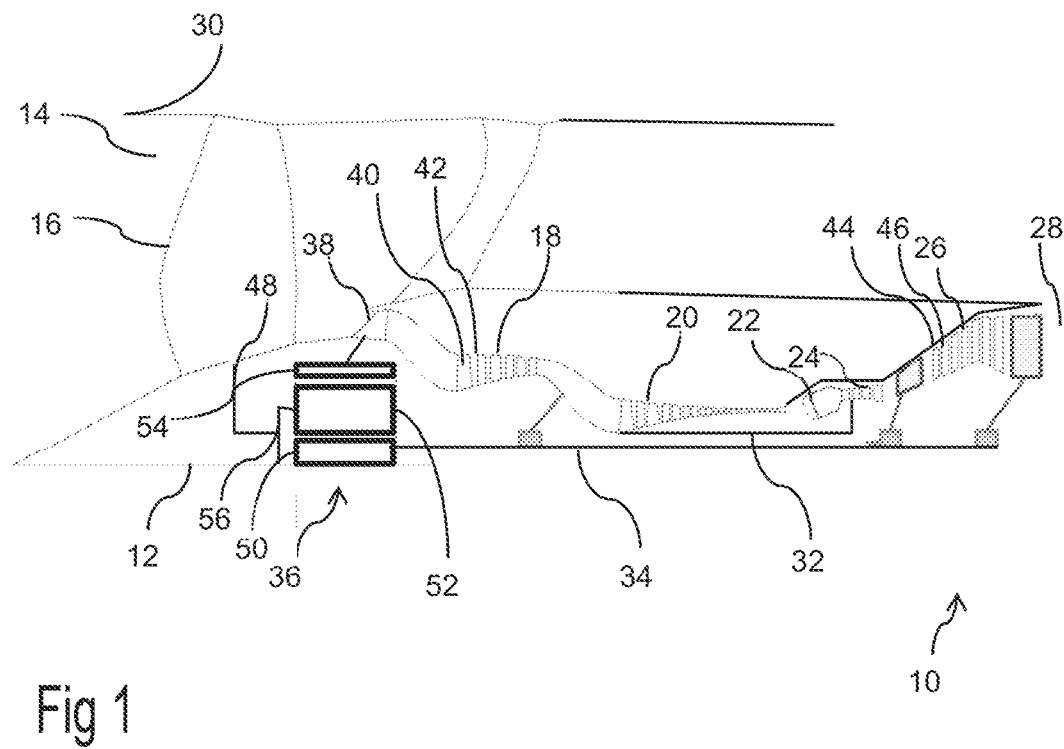
FIG. 1 is a sectional side view of a first gas turbine engine.

With reference to FIG. 1, a gas turbine engine is generally indicated at 10, having a principal and rotational axis 12, which defines an axial direction. The engine 10 comprises, in axial flow series, an air intake 14, a propulsive fan 16, a low pressure compressor 18, a high-pressure compressor 20, combustion equipment 22, a high-pressure turbine 24, a low-pressure fan drive turbine 26 and an exhaust nozzle 28. A nacelle 30 generally surrounds the engine 10 and defines the intake 14. In the combustion equipment 15 the air flow is mixed with fuel and the mixture combusted. The resultant hot combustion products then expand through, and thereby drive the high and low-pressure turbines 24, 26 before being exhausted through the nozzle 28 to provide additional propulsive thrust.

The gas turbine engine 10 works in the conventional manner so that air entering the intake 14 is accelerated by the fan 16 to produce two air flows: a first air flow into the low pressure compressor 18 and a second air flow which passes through a bypass duct 21 to provide propulsive thrust. The high-pressure compressor 20 compresses the air flow directed into it before delivering that air to the combustion equipment 22.

Each compressor 18, 20 is in the form of an axial flow compressor, having one or more compressor stages, each compressor stage comprising a rotating rotor 40, and a static stator 42. In general, the number of compressor stages is selected such that a desired overall pressure ratio (OPR) is provided by the compressor. In the first described embodiment, a total of thirteen compressor stages are provided, in order to provide a high overall pressure ratio at cruise conditions greater than 40:1, and perhaps as high as 60:1 or even as high as 80:1. The low pressure compressor 18 provides three of these stages, while the high pressure compressor 20 provides the remaining ten.

Similarly, in order to absorb the energy in the core exhaust gas stream, a high turbine expansion ratio is desired. Again, each turbine 24, 26 comprises one or more turbine stages, each stage comprising a rotor 44 and a stator 46. In this embodiment, the high pressure turbine 24 comprises two turbine stages, and the low pressure turbine 26 comprises four turbine stages.

Referring again to FIG. 1, the high pressure compressor 20 is coupled to the high pressure turbine 24 by a high pressure shaft 32. Similarly, the low pressure compressor 18 is coupled to the low pressure turbine 26 by a low pressure shaft 34. The low pressure shaft 34 also drives the propulsive fan 16 via a reduction gearbox 36. The low pressure and high pressure shafts 32, 34 are coaxial, with the low pressure shaft 34 being provided radially inwardly of the high pressure shaft 32, and extending forwardly and rearwardly of the high pressure shaft 32. Consequently, each of the shafts 32, 34 rotates about the common rotational axis 12.

The reduction gearbox 36 is provided forwardly of the low pressure compressor 18, and is configured to couple power from the low pressure turbine input shaft 34, to an output fan shaft 48 at a lower rotational speed. The gearbox generally has a reduction ratio of between 2:1 and 5:1, and in this specific example has a reduction ratio of 4:1. The gearbox includes a sun gear 50 which meshes with a plurality of planet gears 52, which in turn mesh with a ring gear 54. The ring gear 54 is held static, while the planet gears rotate and orbit around the sun gear 50, and are held by a planet carrier 56. The planet carrier 56 is coupled to the fan input shaft 48, to thereby drive the fan 16. It will be understood however, that other types of epicyclic gearboxes are also known. For example, a further type of epicyclic gearbox is the "star" gearbox, in which the planet carrier is held stationary, and the ring gear rotates. In this application, the ring gear would drive the fan, with the input being provided to the sun gear.

Figure 2:
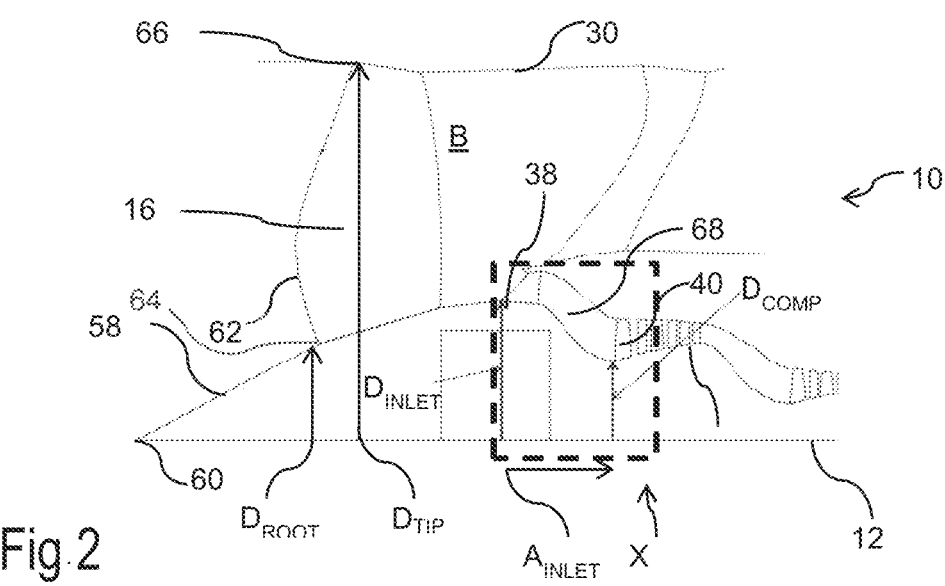
FIG. 2 is a scale sectional side view of part of the gas turbine engine of FIG. 1.

FIG. 2 is a schematic drawing showing the front half of the gas turbine engine 10 of FIG. 1, illustrating various relative ratios of the engine 10.

The fan 16 is mounted to the fan input shaft 48 via a fan hub 58. The fan hub extends from a tip 60 at a forward end of the engine 10, and has a generally conical shape extending radially outwardly in a rearward direction. The fan hub 58 rotates with the fan input shaft 48 and the fan 16, as the fan 16 is attached thereto.

The engine core comprises a core inlet 38 downstream of the fan 16, the inlet 38 defining a forward, upstream end of a core main gas flow passage 68. A core inlet stator 70 (also known as an engine section stator, ESS) is provided at the core inlet 38, which straightens airflow from the fan 16.

Figure 3:
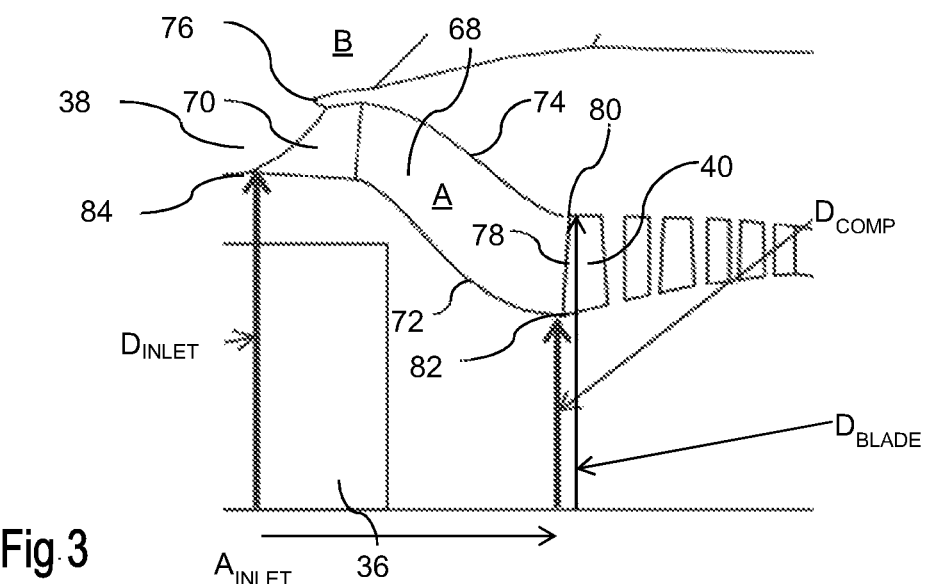
FIG. 3 is a scale sectional side view of region X of FIG. 2

The passage 68 is shown more clearly in FIG. 3, and is defined by radially inner and radially outer walls 72, 74. An upstream end of the radially outer wall 74 defines a bifurcation 76, which divides airflow from the fan 16 into core A and bypass B streams. An axial position of the inlet 38 is defined by a root leading edge 84 of the inlet stator 70. At the axial position of the inlet 38, the radially inner wall 72 defines a core inlet diameter $D_{INLET}$, the diameter being a distance between opposite inner walls 72 in a direction normal to the engine axis 12 at the inlet 38.

The passage 68 communicates with an inlet of the low pressure compressor 18. A first, axially forwardmost rotor 40 of the low pressure compressor 18 defines a leading edge 78 at a forward end, a tip 80 at a radially outer end, and a root 82 at a radially inner end. A low pressure compressor first rotor inner diameter $D_{COMP}$ is defined by the root 82 of the first compressor rotor blade 40 at the leading edge 78.

A characteristic parameter of the engine 10 is a first ratio $R_1$, $D_{INLET}D_{COMP}$ between the core inlet diameter $D_{INLET}$ and the first rotor inner diameter $D_{COMP}$. This ratio is greater than or equal to 1.5, and in this embodiment is approximately 1.5. Typically, the first ratio $R_1$ is between 1.5 and 3, and in come embodiments is between 1.5 and 1.75. Consequently, the inlet is situated significantly further radially outwardly than the root of the first compressor 40 in this engine 10 compared to prior engines. This is the result of a number of factors.

As discussed above, engine 10 comprises a reduction gearbox 36 that couples the low pressure turbine 26 to the fan 16. Consequently, the fan 16 rotates at relatively slow speeds, permitting a large fan tip diameter, without resulting in an excessive tip speed, thereby reducing noise, and increasing efficiency relative to prior designs. However, in view of the low rotational speed and large fan diameter, a relatively large hub diameter (i.e. the diameter of the hub at the root of the fan blades) is required, since the circumferential velocity at the root of the fan blades is low. Consequently, a large compressor inlet diameter $D_{INLET}$ is defined.

Meanwhile, the low pressure compressor 18 is directly coupled to the low pressure turbine 26 by a shaft 34. Consequently, the low pressure compressor 18 rotates at a much higher speed relative to the fan 16, and so a relatively smaller diameter low pressure compressor can be accommodated, with correspondingly lower weight. This results in a relatively high $D_{INLET}:D_{COMP}$ ratio.

Conveniently, this design also provides a large space between the low pressure compressor 18 and the fan 16 in which the gearbox 36 can be installed. Consequently, an efficient epicyclic gearbox 36 can be employed without significant design compromises due to space constraints.

Further characteristic parameters are also defined as a result of the engine architecture. The fan 16 defines a leading edge 62 at a forward side, a blade root 64 at a radially inner end of the blade adjacent the hub 58, and a blade tip 66 at a radially outer end of the blade adjacent the nacelle 30. A fan blade diameter $D_{FAN}$ is defined by a swept by the fan blade tips 66 of the fan blade 16. A first compressor rotor blade diameter $D_{BLADE}$ is similarly defined by a diameter swept by the tips 80 of the compressor rotor blades 40. A ratio $D_{FAN}:D_{BLADE}$ is defined by the value of $D_{FAN}$ divided by the value of $D_{BLADE}$. This ratio is a function of the bypass ratio and the gearbox reduction ratio, and so is an important characteristic of a geared turbofan. The diameter $D_{FAN}:D_{BLADE}$ is generally between 2.5 and 3.5, and is approximately 3:1 in this embodiment.

Similarly, an axial inlet passage 68 distance $A_{INLET}$ is defined by a distance parallel to the engine longitudinal axis 12 between the core inlet 38 and the root 82 of the first compressor rotor blade 40 at the leading edge 78. A ratio $A_{INLET}:(D_{INLET}-D_{COMP})$ is defined by the value of $A_{INLET}$ divided by the difference between the inlet diameter $D_{INLET}$ and the first rotor inner diameter $D_{COMP}$. In the present disclosure, the ratio $A_{INLET}:(D_{INLET} D_{COMP})$ is between 0.8 and 1.2. A relatively low ratio $A_{INLET}:(D_{INLET}-D_{COMP})$ is provided in the present disclosure, corresponding to a relatively short inlet passage 68, and a relatively high inlet diameter relative to the compressor diameter. Consequently, a relatively "steep" inlet passage 68 is provided.

The fan also has a relatively low tip to hub ratio $D_{TIP}:D_{ROOT}$ defined by the diameter of the fan 16 from tip to tip 66 at the leading edge 62, divided by the diameter of the fan hub 58 at the leading edge 62 of between 3:1 and 5:1, and in the described embodiment is approximately 4:1. This is a consequence in part of the geared architecture, since the relatively slow moving fan results in a slow circumferential speed at low diameters.

Similarly, a ratio $D_{TIP}:D_{INLET}$ between the fan tip diameter $D_{TIP}$ divided by the core inlet diameter $D_{INLET}$ is between 2.5 and 3.5, and in the described embodiment is approximately 2.75.

A further ratio $D_{TIP}:D_{COMP}$ is defined by a value of the diameter $D_{TIP}$ at the leading edge of the tip of the fan 16 and the diameter at the leading edge at the root of the first rotor blade. The fourth ratio may be between 4 and 6, and may be approximately 5. This ratio relates the engine core size to the engine fan diameter, and is particularly high in this engine, in view of the high bypass ratio, and reduction gear ratio.

The engine 10 is designed for relatively high thrusts typical of engines for large, wide-body civilian aircraft. For example, the engine 10 may have a thrust range of between 50,000 and 100,000 lbs of thrust, and has a bypass ratio of 13:1 and 25:1.

Consequently, in view of the above parameters, the gas turbine engine of the present invention has a high efficiency, short length and low weight.

Other embodiments are envisaged, having parameters and dimensions within the above ranges. Specific examples of ratios $R_1$ to $R_6$ of further embodiments are given in the below TABLE 1:

| Example | $R_1$ | $R_2$ | $R_3$ | $R_4$ | $R_5$ | $R_6$ | Compression ratio at cruise |
|---|---|---|---|---|---|---|---|
| 1 | 1.50 | 1.28 | 3.83 | 4.14 | 2.77 | 2.89 | 55 |
| 2 | 1.48 | 1.17 | 3.92 | 4.13 | 2.79 | 2.89 | 66 |
| 3 | 1.73 | 1.06 | 3.67 | 4.57 | 2.64 | 3.01 | 51 |

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An aircraft gas turbine engine comprising:
   a fan coupled to a fan drive turbine, the fan being configured to provide a bypass flow and a core flow in use;
   a reduction gearbox which couples the fan to the fan drive turbine;
   a core compressor arrangement, the core compressor arrangement having a core inlet at an upstream end of a core gas flow passage defined by radially inner and outer walls, the radially inner wall of the core inlet defining a first diameter; wherein
   the core compressor arrangement comprises an axially forwardmost compressor rotor blade, a root leading edge of the axially forwardmost compressor rotor blade defining a second diameter, wherein a first ratio of the first diameter to the second diameter is greater than or equal to 1.4 and less than or equal to 3; and
   wherein a first axial distance is defined by an axial distance between the core inlet and the root leading edge of the axially forwardmost compressor rotor blade, a second ratio is defined by a ratio of the first axial distance divided by a difference between the first diameter and the second diameter, wherein the second ratio is greater than or equal to 0.8, and less than or equal to 1.5.

2. The engine according to claim 1, wherein the first ratio is 1.5.

3. The engine according to claim 1, wherein the first ratio is 1.75.

4. The engine according to claim 1, wherein the second ratio is greater than or equal to 0.8, and less than or equal to 1.2.

5. The engine according to claim 1, wherein a third ratio is defined by a ratio between a diameter at the leading edge at a root of the fan and a diameter at a leading edge of a tip of the fan, wherein the third ratio is greater than or equal to 0.2 and less than or equal to 0.4.

6. The engine according to claim 5, wherein the third ratio is 0.25.

7. The engine according to claim 1, wherein a fourth ratio is defined by a ratio between the diameter at the leading edge of a tip of the fan and the diameter at the leading edge at the root of the first core compressor rotor blade, wherein the fourth ratio is greater than or equal to 3 and less than or equal to 6.

8. The engine according to claim 1, wherein a fifth ratio is defined by a ratio between the diameter at the leading edge of the tip of the fan and the diameter at the core inlet, wherein the fifth ratio is greater than or equal to 2.5 and less than or equal to 3.5.

9. The engine according to claim 1, wherein a sixth ratio is defined by a ratio between the diameter at the leading edge of the tip of the fan and the diameter at a leading edge of the tip of the forwardmost compressor rotor blade, wherein the sixth ratio is greater than or equal to 2.5 and 3.5.

10. The engine according to claim 1, wherein the core compressor arrangement comprises a low pressure compressor upstream of a high pressure compressor.

11. The engine according to claim 10, wherein the low pressure compressor is directly coupled to the fan drive turbine by a low pressure shaft.

12. The engine according to claim 10, wherein the low pressure compressor is configured to provide a pressure ratio between 2:1 and 4:1.

13. The engine according to claim 10, wherein the high pressure compressor is configured to provide a pressure ratio between 10:1 and 30:1.

14. The engine according to claim 10, wherein the low pressure compressor comprises between 2 and 4 stages, and the high pressure compressor may comprise between 8 and 12 stages.

15. The engine according to claim 1, wherein the gearbox has a reduction ratio of between 2:1 and 5:1.

16. A method comprising:
providing an aircraft gas turbine engine, which includes:
a fan coupled to a fan drive turbine and configured to provide a bypass flow and a core flow in use,
a reduction gearbox which couples the fan to the fan drive turbine, and
a core compressor arrangement having a core inlet at an upstream end of a core gas flow passage defined by radially inner and outer walls, the radially inner wall of the core inlet defining a first diameter, wherein
the core compressor arrangement comprises an axially forwardmost compressor rotor blade, a root leading edge of the axially forwardmost compressor rotor blade defining a second diameter, wherein a first ratio of the first diameter to the second diameter is greater than or equal to 1.4 and less than or equal to 3, and wherein a first axial distance is defined by an axial distance between the core inlet and the root leading edge of the axially forwardmost compressor rotor blade, a second ratio is defined by a ratio of the first axial distance divided by a difference between the first diameter and the second diameter, wherein the second ratio is greater than or equal to 0.8, and less than or equal to 1.5; and
wherein the aircraft gas turbine engine, during operation, has a bypass ratio greater than or equal to 13 and less than or equal to 25, wherein the bypass ratio is defined by a ratio of air mass flow passing through the fan and around the core inlet, to airflow passing through the core inlet.

17. The method of claim 16, wherein the engine provides an overall pressure ratio of between 40:1 and 80:1 during operation of the engine.

18. The method of claim 16, wherein the fan has a fan pressure ratio of between 1.31 and 1.5 during operation of the engine.

* * * * *